(12) United States Patent
Jaenike et al.

(10) Patent No.: US 10,968,819 B2
(45) Date of Patent: Apr. 6, 2021

(54) ADJUSTING DEVICE FOR A TURBOCHARGER, AND TURBOCHARGER

(71) Applicant: IHI Charging Systems International GmbH, Heidelberg (DE)

(72) Inventors: Lorenz Jaenike, Heidelberg (DE); Ralf Schawer, Schwetzingen (DE); Jens Zweydinger, Mannheim (DE)

(73) Assignee: IHI Charging Systems International GmbH, Amt Wachsenburg OT Ichtershausen (DE)

( * ) Notice: Subject to any disclaimer, the term of this patent is extended or adjusted under 35 U.S.C. 154(b) by 0 days.

(21) Appl. No.: 16/064,510

(22) PCT Filed: Jan. 10, 2017

(86) PCT No.: PCT/EP2017/000026
§ 371 (c)(1),
(2) Date: Jun. 21, 2018

(87) PCT Pub. No.: WO2017/125241
PCT Pub. Date: Jul. 27, 2017

(65) Prior Publication Data
US 2019/0003377 A1    Jan. 3, 2019

(30) Foreign Application Priority Data
Jan. 20, 2016  (DE) .................... 10 2016 100 901.6

(51) Int. Cl.
*F02B 37/18*    (2006.01)

(52) U.S. Cl.
CPC ........ *F02B 37/186* (2013.01); *F05D 2240/40* (2013.01); *Y02T 10/12* (2013.01)

(58) Field of Classification Search
CPC ........ F02B 37/186; F02B 37/20; F02B 37/22; F02B 37/225; F02B 37/24
(Continued)

(56) References Cited

U.S. PATENT DOCUMENTS

2012/0055154 A1*  3/2012  Ebert ................. F02B 37/183
                                                                60/602
2014/0321986 A1   10/2014  Takahashi et al.
(Continued)

FOREIGN PATENT DOCUMENTS

CN         102414418 A      4/2012
CN         104024598 A      9/2014
(Continued)

*Primary Examiner* — Kenneth Bomberg
*Assistant Examiner* — Jason Mikus

(57) ABSTRACT

The invention relates to a control device for a turbocharger, comprising an exhaust gas conducting section through which fluid can flow and which includes a bypass duct for bypassing a turbine wheel that is rotatably arranged in the exhaust gas conducting section, and comprising an adjusting arm (3) for accommodating a valve element (2) provided for opening or blocking a flow cross-section of the bypass duct; the adjusting arm (3) is movably accommodated in the exhaust gas conducting section; furthermore, a flexible element (14) is provided at least for securing the valve element (2) in place on the adjusting arm (3). According to the invention, the flexible element (14) is designed to be retained radially and axially by the valve element (2).

12 Claims, 3 Drawing Sheets

(58) Field of Classification Search
USPC .......................................................... 415/145
See application file for complete search history.

(56) References Cited

U.S. PATENT DOCUMENTS

| | | | |
|---|---|---|---|
| 2014/0345273 A1* | 11/2014 | Yamaguchi | F02B 37/183 60/602 |
| 2014/0366530 A1* | 12/2014 | Murayama | F02B 37/186 60/602 |
| 2015/0125273 A1 | 5/2015 | Tschirschke | |
| 2016/0178028 A1 | 6/2016 | Lummer et al. | |
| 2016/0348574 A1 | 12/2016 | Goeckelmann et al. | |
| 2018/0073425 A1 | 3/2018 | Stilgenbauer et al. | |

FOREIGN PATENT DOCUMENTS

| | | |
|---|---|---|
| CN | 104145098 A | 11/2014 |
| CN | 104379897 A | 2/2015 |
| CN | 105715362 A | 6/2016 |
| DE | 102010043147 A1 | 10/2011 |
| DE | 102011076361 A1 | 11/2012 |
| DE | 102012101322 A1 | 12/2012 |
| JP | 2013155687 A | 8/2013 |
| WO | 2013192029 A1 | 12/2013 |
| WO | 2014011468 A1 | 1/2014 |

\* cited by examiner

ADJUSTING DEVICE FOR A TURBOCHARGER, AND TURBOCHARGER

TECHNICAL FIELD

The disclosure relates to an adjusting device for an exhaust turbocharger and to an exhaust turbocharger.

BACKGROUND

DE 10 2012 101 322 A1 discloses an adjusting device for an exhaust turbocharger having a turbine, wherein the turbine comprises an exhaust gas conducting section, through which fluid can flow, and a bypass duct which serves to bypass an exhaust gas flow of a turbine wheel disposed in the exhaust gas conducting section. The adjusting device comprises a valve element for closing the bypass duct, and an adjusting arm which accommodates the valve element. This adjusting arm is rotatably mounted in the exhaust gas conducting section. The valve element is secured in place on the adjusting arm with the support of a spring element in order to avoid noise and to optimize wear or reduce wear during operation of the exhaust turbocharger.

It is problematic that, owing to the operation of the exhaust turbocharger, in particular in connecting the exhaust turbocharger to an internal combustion engine, the exhaust turbocharger is subjected to temperature fluctuations and body vibrations. The temperature fluctuations lead to constant heating and cooling of the individual components of the exhaust turbocharger, wherein the greatest temperature fluctuations are present in particular in the region of the turbine of the exhaust turbocharger owing to the combustion product of the internal combustion engine flowing through the exhaust gas conducting section. Therefore, the closer a component of the exhaust turbocharger is disposed to a duct of the exhaust gas conducting section containing the through-flowing combustion product, the greater the probability of failure of this component because the constantly repeating changes in temperature lead to a constant change in the expansion of the components, whereby loosening, stresses or material fatigue can occur. Since the movable connection is formed with the aid of the securing element exerting compression stress and therefore comprising the adjusting members to be connected, an outer side of the securing element is positioned close to the duct containing the combustion product and is consequently subjected to the temperature fluctuations mentioned above.

The spring element serves to secure the valve element in place in each position. In a closed position, the flow cross-section is to be closed without leakages with the aid of the valve element so that there are no losses in the degree of efficiency of the exhaust turbocharger. When the valve element is in an opened position in which it partially or completely releases the flow cross-section, it is possible, owing to the exhaust gas flow in the bypass duct, for vibrations to be generated in the valve element. These should also be avoided since they can be accompanied by rattling noises.

The object of the present invention is to provide an improved control device for an exhaust turbocharger. A further object of the invention is to produce an improved exhaust turbocharger.

SUMMARY

This object is achieved by an adjusting device for an exhaust turbocharger as described and claimed. The further object is achieved by an exhaust turbocharger as described and claimed.

The control device in accordance with the invention for an exhaust turbocharger comprises a valve element accommodated on an adjusting arm of the control device. The valve element is disposed in an exhaust gas conducting section—through which fluid can flow—of the exhaust turbocharger in a bypass duct of the exhaust gas conducting section and serves to open or close a flow cross-section of the bypass duct. The bypass duct makes it possible to bypass a turbine wheel rotatably disposed in the exhaust gas conducting section, which turbine wheel, when the flow cross-section is closed, has flowing through it the entire exhaust gas quantity which flows through the exhaust gas conducting section. The adjusting arm is movably accommodated in the exhaust gas conducting section. In order to secure the valve element in place a spring element is provided on the adjusting arm. In accordance with the invention the spring element is designed to be held radially and axially by the valve element.

In a conventional manner, prior art spring elements can move in an axial direction along a valve longitudinal axis. In other words, they can be compressed so that their axial expansion is reduced or they relax so that their axial expansion increases. This takes place in dependence upon the forces acting upon the valve element. In order to avoid rattling noises the valve element is secured in place by a force exerted on the valve element by the spring element. In order for the spring element to be able to exert its force on the valve element, the spring element is positioned between the adjusting arm and a cover element provided to secure the valve element.

In order to reduce the cost of components for the control device, the spring element is held radially and axially in accordance with the invention by the valve element. The cover element is therefore no longer required and component costs are reduced. A further advantage is the avoidance of rattling noises occurring during closing of the bypass duct.

The spring element is advantageously formed on a spigot of the valve element in a form-fitting manner therewith. Therefore, it is possible to accommodate the spring element in a simple manner since the spigot serves to connect the valve element to the adjusting arm.

In an advantageous manner, the spring element is disposed in a form-fitting manner between a first section of the valve element and a second section of the valve element. There is therefore the possibility of clamping the spring element in the valve element. This can be effected in a particularly preferred manner with the aid of a riveting process, wherein the spring element is held in a form-fitting manner between the first section and the second section.

In a further embodiment, the spring element is disposed on the valve element with the aid of a hold-down device. The hold-down device serves for simplified mounting in that the spring element can be held down prior to the riveting process. The spring element lies with its outer diameter not on the cover element as in the prior art, whereby the spring element itself is not defined in its outer diameter by the outer diameter of the cover element and can be designed in an optimised manner. Further advantages of the hold-down device are that any turning over of the spring element is avoided, loads occurring during the riveting process are absorbed and the spring element is relieved and thus undergoes less deformation. The use of the hold-down device is also advantageous provided welding rather than riveting is used, since less heat is introduced into the spring element when using a hold-down device.

In a further embodiment, the hold-down device comprises a further outer diameter which is smaller than an outer diameter of the spring element. In this way, the movability of the valve element is not limited by the hold-down device.

In a further embodiment, a second contact surface of the spring element, which has a smaller diameter than an outer edge of the spring element, has contact with the adjusting arm, wherein a space is formed between the outer edge and the adjusting arm. The possibility is thereby provided of radially sliding the spring element on the adjusting arm so that, within the system consisting of the valve element and adjusting arm, tilting movements caused by the decentralized loading can be compensated for without causing additional wear by reason of the relative movements at the contact positions of the slide pairings. This leads to increased service life of the control device.

The second aspect of the invention relates to an exhaust turbocharger which comprises an exhaust gas conducting section, through which fluid can flow, having a bypass duct for bypassing a turbine wheel rotatably disposed in the exhaust gas conducting section, and having a control device for opening and closing a flow cross-section of the bypass duct, wherein the control device is designed according to one of claims 1 to 6. An exhaust turbocharger is therefore provided which in addition to increased service life also comprises quick response behavior of the control device.

Further advantages, features and details of the invention will be apparent from the following description of preferred exemplified embodiments and with reference to the drawing. The features and combinations of features mentioned earlier in the description and the features and combinations of features mentioned hereafter in the description of the figures and/or only illustrated in the figures can be employed not only in the combination stated in each case but also in other combinations or on their own without departing from the scope of the invention.

DETAILED DESCRIPTION

Figure 1:
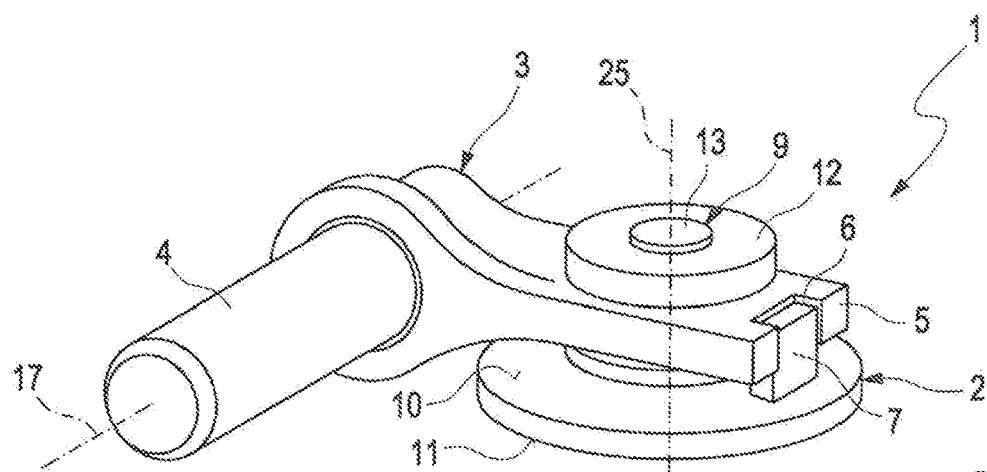
FIG. 1 is a perspective view of a control device of an exhaust turbocharger according to the prior art.
Figure 2:
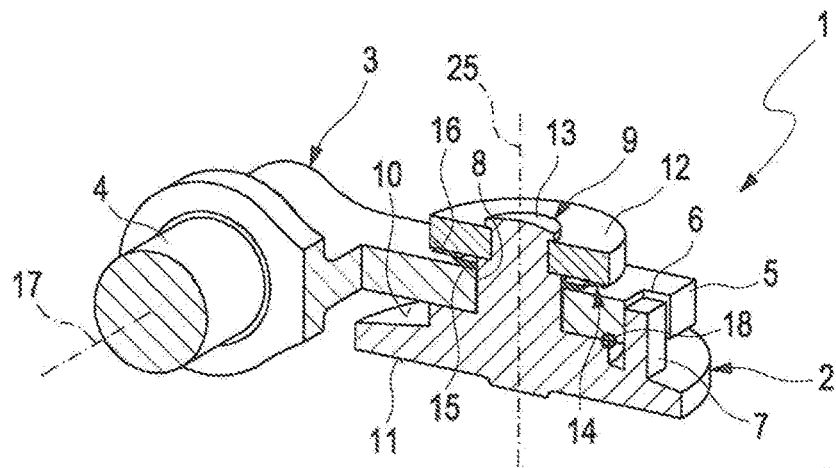
FIG. 2 is a perspective cross-sectional view of the control device of FIG. 1.
Figure 3:
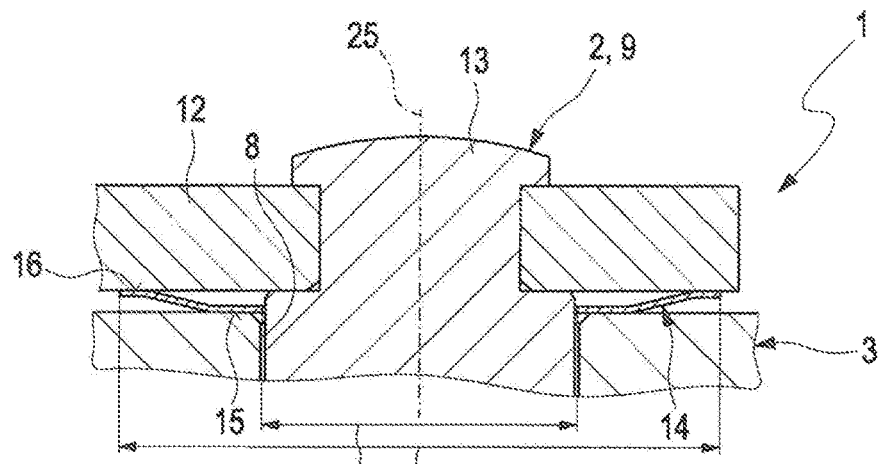
FIG. 3 is a section of a longitudinal cross-section of the control device of FIG. 1.

A control device 1 of an exhaust turbocharger, not illustrated in more detail, according to the prior art is designed as illustrated in FIG. 1. The exhaust turbocharger comprises an exhaust gas conducting section, through which fluid can flow and which is not illustrated in more detail, said exhaust gas conducting section having a fluid, generally exhaust gas, flowing through it during operation of the exhaust turbocharger. The exhaust gas is generally a combustion product of an internal combustion engine, not illustrated in more detail. Such control devices are also known as wastegate devices.

The exhaust turbocharger is allocated an air conducting section, through which fluid can flow and which is not illustrated in more detail, and a bearing section which is positioned between the exhaust gas conducting section and the air conducting section and is not illustrated in more detail, wherein a rotor assembly, not illustrated in more detail, is rotatably accommodated in the bearing section. The rotor assembly comprises a compressor wheel, not illustrated in more detail, and a turbine wheel, not illustrated in more detail, these being connected to one another for conjoint rotation by means of a shaft, not illustrated in more detail. The compressor wheel is rotatably accommodated in a first wheel chamber, not illustrated in more detail, of the air conducting section in order to take in generally fresh air, and the turbine wheel is rotatably accommodated in a second wheel chamber, not illustrated in more detail, of the exhaust gas conducting section. When the exhaust turbocharger is in operation, the turbine wheel is subjected to, and driven by, the exhaust gas flowing through the exhaust gas conducting section, wherein a rotational movement can be effected. This rotational movement can be transferred to the compressor wheel with the aid of the shaft, which compressor wheel can therefore effect a rotational movement simultaneously with the rotational movement of the turbine wheel. With the aid of the compressor wheel and the rotational movement thereof, fresh air is taken in and is compressed in the air conducting section.

The exhaust turbocharger is designed as a so-called wastegate charger, i.e. it comprises the control device 1 for complete or partial bypassing of the turbine wheel with the aid of a bypass duct, not illustrated in more detail, formed in the exhaust gas conducting section. This control device 1, which serves to control a flow cross-section, not illustrated in more detail, of the bypass duct, comprises a valve element 2, designed to be able to close and open said duct, preferably in the form of a flap, generally designated as a wastegate flap or wastegate valve, and an adjusting device, not illustrated in more detail, for actuating this valve element 2.

The valve element 2, comprising a valve element longitudinal axis 25, is disposed on an adjusting arm 3 of the adjusting device. The adjusting arm 3 comprises, on its end 5 remote from an adjusting shaft 4 of the adjusting arm 3, a forked accommodating opening 6 for accommodating a securing pin 7.

The securing pin 7 serves to prevent rotation of the valve element 2 which is accommodated in a further accommodating opening 8 of the adjusting arm 3 with the aid of a pin-shaped or bolt-shaped spigot 9. The spigot 9 and the securing pin 7 are formed on a first valve surface 10 facing the adjusting arm 3. A second valve surface 11 of the valve element 2 remote from the first valve surface 10 is positioned facing the flow cross-section to be controlled.

The valve element 2 is fixed with the aid of a cover disc 12 on the adjusting arm 3. The spigot 9 protrudes through the further accommodating opening 8 and into the cover disc 12. On its spigot end 13 remote from the second valve surface 11 it is connected in a rivet-like manner to the adjusting arm 3 with the aid of the cover disc 12. It can similarly also be welded, or welded and riveted or soldered, pressed or glued.

A spring element 14 for tensioning the valve element 2 is disposed between the adjusting arm 3 and the cover disc 12, whereby rattling noises during movement of the valve element 2 are reduced. Furthermore, this spring element 14 serves to compensate for play, in particular even play compensation owing to large changes in temperature during operation of the exhaust turbocharger. In particular, the wear between the adjusting arm 3, the valve element 2 and the spring element 14 is reduced or avoided. The wearing of the valve element 2 is dependent on its installation position and gravity and is eliminated with the aid of the spring element 14.

The spring element 14 is designed as a plate spring and comprises an inner diameter DI and an outer diameter DA. In the region of the inner diameter DI a first contact surface 15 is formed which is on a level with the adjusting arm 3. In other words, the first contact surface 15 lies flat against the adjusting arm 3. In the region of the outer diameter DA a second contact surface 16 is formed which is likewise on a level with the cover disc 12. In other words, the second contact surface 16 is supported flat against the cover disc 12.

Figure 4:
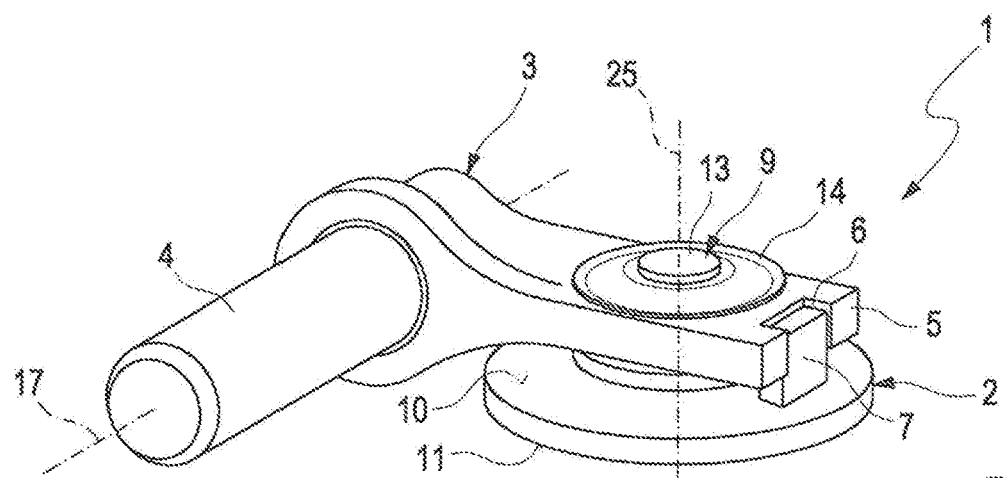
FIG. 4 is a perspective view of a control device in accordance with the invention in a first exemplified embodiment of an exhaust turbocharger in accordance with the invention.
Figure 5:
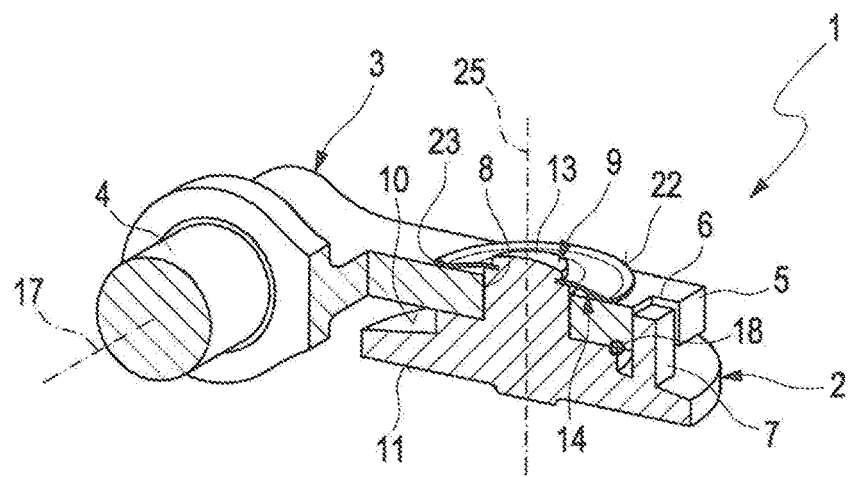
FIG. 5 is a perspective cross-sectional view of the control device of FIG. 4.
Figure 6:
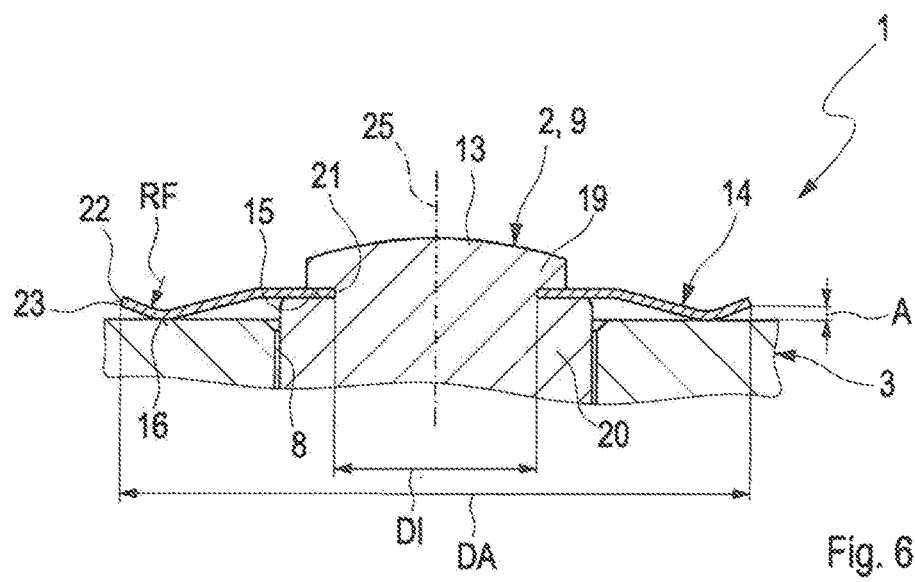
FIG. 6 is a detail of a longitudinal cross-section of the control device of FIG. 4.

FIGS. 4 to 6 illustrate a first exemplified embodiment of a control device 1 in accordance with the invention. The control device 1 in accordance with the invention comprises the spring element 14 which is designed in such a way that it is held radially and axially by the valve element 2.

As shown in particular by FIG. 6, the spring element 14 is accommodated in a form-fitting manner between a first section 19 and a second section 20 of the valve element 2. The first section 19 and the second section 20 comprise different diameters prior to mounting of the spring element 14, so that the spring element 14 can be accommodated by the first section 19 while encompassing same. The spring element 14 is riveted to the valve element 2 with the aid of a riveting process, wherein the spigot 9 is designed as a rivet. By reason of the riveting process, the spring element 14 is clamped between the first section 19 and the second section 20, wherein form-fitting accommodation is provided between the two sections 19, 20. After the riveting process, the spring element 14 is fixedly connected to the valve element 2. After the riveting process a groove 21 is formed between the first section 19 and the second section 20, in which groove the spring element 14 is positioned.

The spring element 14 comprises the first contact surface 15 in the region of its inner diameter DI. In the region of its outer periphery 22 with its outer diameter DA, the spring element 14 is arcuate, wherein a spring element radius RF is formed on the outer diameter DA. The spring element radius RF could likewise be so small that the spring element 14 is formed in a bent manner in the region of the second contact surface 16

With the aid of the spring element radius RF the second contact surface 16 is formed in a quasi-linear manner since an outer edge 23 of the spring element 14 does not lie against the adjusting arm 3 and a space A is formed between the outer edge 23 and the adjusting arm 3. In other words, this means that it is very small compared with the second contact surface 16 of the prior art so that a high level of pressing force can be produced in order to stabilise the valve element 2. Furthermore, by reason of the small second contact surface 16 a low level of static friction is applied so that a tilting movement of the valve element 2 about a tilt point 18 is quickly compensated for and only low-level setting forces are to be applied by the actuator.

Figure 7:
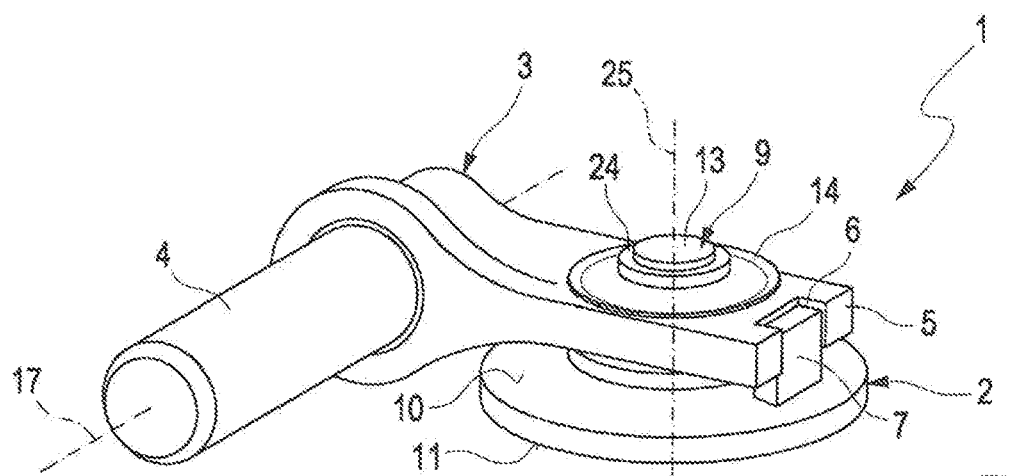
FIG. 7 is a perspective view of a second exemplified embodiment of the control device in accordance with the invention.
Figure 8:
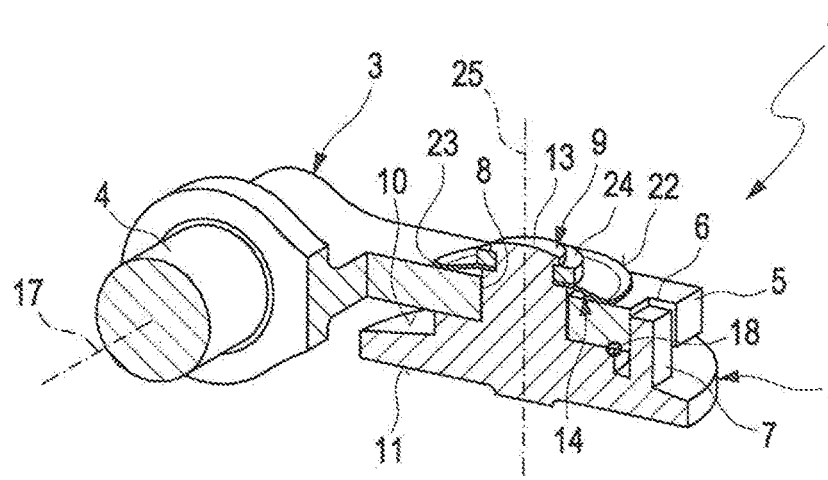
FIG. 8 is a perspective cross-sectional view of the control device of FIG. 7.
Figure 9:
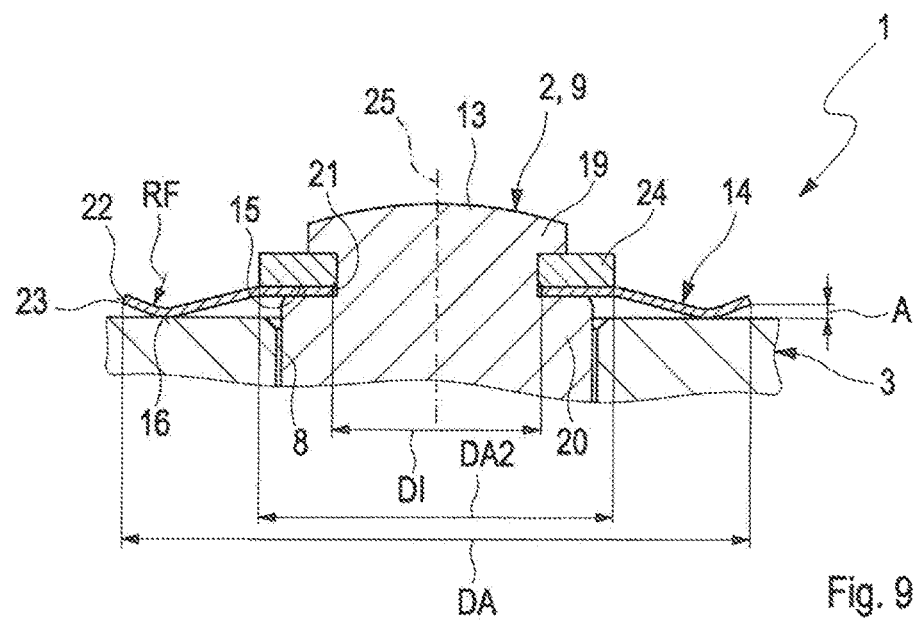
FIG. 9 is a detail of a longitudinal cross-section of the control device of FIG. 8.

FIGS. 7 to 9 illustrate a second exemplified embodiment of the control device in accordance with the invention. For simplified mounting, a disc-shaped hold-down device 24 is accommodated in the groove 21 in the region of the first contact surface 15. The hold-down device 24 comprises a further outer diameter DA2 which is smaller than the outer diameter DA of the spring element 14, whereby, during a process of positioning the valve element 2, the second contact surface 16 is not opposite to any stop which prevents movement.

The invention claimed is:

1. A control device for an exhaust turbocharger, comprising:
    an adjusting arm for accommodating a valve element which is provided for opening or closing a flow cross-section of a bypass duct of the exhaust turbocharger,
    wherein the adjusting arm is movably accommodated in an exhaust gas conducting section of the exhaust turbocharger, and
    wherein a circular symmetrical spring element is provided at least for securing the valve element in place on the adjusting arm,
    wherein an inner portion of the spring element is held within a groove below a spigot end of the valve element, the inner portion being fixedly connected to the valve element and radially and axially immovable relative to the valve element, and
    wherein an outer portion of the spring element is in contact with the adjusting arm,
    further comprising a hold-down device accommodated in the groove above the spring element.

2. The control device as claimed in claim 1,
    wherein the spring element is formed on a spigot of the valve element in a form-fitting manner therewith.

3. The control device as claimed in claim 1,
    wherein the spring element is disposed in a form-fitting manner between a first section of the valve element and a second section of the valve element.

4. The control device as claimed in claim 1,
    wherein the spring element is disposed on the valve element with the aid of a hold-down device.

5. The control device as claimed in claim 4,
    wherein the hold-down device comprises a further outer diameter which is smaller than an outer diameter of the spring element.

6. The control device as claimed in claim 1,
    wherein a contact surface of the spring element, which has a smaller diameter than an outer edge of the spring element, has contact with the adjusting arm and
    wherein, between the outer edge and the adjusting arm a space is formed.

7. An exhaust turbocharger, having an exhaust gas conducting section, through which fluid can flow and which has a bypass duct for bypassing a turbine wheel rotatably disposed in the exhaust gas conducting section, and having a control device as in claim 1 for opening and closing a flow cross-section of the bypass duct.

8. The control device as claimed in claim 1, wherein the spring element is riveted to the valve element.

9. The control device as claimed in claim 1, wherein the spring element has a circular convex contact surface facing the adjusting arm.

10. The control device as claimed in claim 1, wherein the inner portion of the spring element is axially spaced at a distance from the adjusting arm.

11. The control device as claimed in claim 1, wherein the spring element is a plate spring.

12. A control device for an exhaust turbocharger, comprising:
    an adjusting arm for accommodating a valve element which is provided for opening or closing a flow cross-section of a bypass duct of the exhaust turbocharger, wherein the adjusting arm is movably accommodated in an exhaust gas conducting section of the exhaust turbocharger, and wherein a spring element is provided at least for securing the valve element in place on the adjusting arm, wherein an inner portion of the spring element is held within a groove below a spigot end of the valve element, the inner portion being fixedly connected to the valve element and radially and axially immovable relative to the valve element, wherein an outer portion of the spring element is in contact with the adjusting arm, and wherein a hold-down device is accommodated in the groove between the spring element and the spigot end of the valve element.

* * * * *